(12) United States Patent
Hirsh et al.

(10) Patent No.: US 12,221,952 B2
(45) Date of Patent: Feb. 11, 2025

(54) HYDRAULIC CONTINUOUS VARIABLE SPEED SYSTEM HAVING HYDRAULIC AND PNEUMATIC SPEED CONTROLS AND A METHOD OF USE

(71) Applicant: PROSTO WIND POWER, Nutley, NJ (US)

(72) Inventors: Douglas S. Hirsh, Skaneateles, NY (US); Radovan Hrinda, Clark, NJ (US)

(73) Assignee: PROSTO WIND POWER, Nutley, NJ (US)

( * ) Notice: Subject to any disclaimer, the term of this patent is extended or adjusted under 35 U.S.C. 154(b) by 0 days.

(21) Appl. No.: 18/383,147

(22) Filed: Oct. 24, 2023

(65) Prior Publication Data

US 2024/0060474 A1 Feb. 22, 2024

Related U.S. Application Data

(63) Continuation of application No. 17/421,054, filed as application No. PCT/US2020/012456 on Jan. 7, 2020, now Pat. No. 11,795,916.

(60) Provisional application No. 62/789,643, filed on Jan. 8, 2019.

(51) Int. Cl.
| | |
|---|---|
| F03D 15/00 | (2016.01) |
| F03D 7/02 | (2006.01) |
| F03D 9/11 | (2016.01) |
| F16H 7/08 | (2006.01) |
| F16H 9/12 | (2006.01) |
| F16H 47/02 | (2006.01) |

(52) U.S. Cl.
CPC .............. *F03D 15/00* (2016.05); *F03D 7/02* (2013.01); *F03D 9/11* (2016.05); *F16H 7/08* (2013.01); *F16H 9/12* (2013.01); *F16H 47/02* (2013.01); *F05B 2220/30* (2013.01); *F05B 2220/706* (2013.01); *F05B 2260/40* (2013.01)

(58) Field of Classification Search
CPC .......... F03D 15/00; F03D 7/02; F03D 7/0276; F03D 9/11; F05B 2210/16; F05B 2220/30; F05B 2220/706; F05B 2260/40; F05B 2260/406; F16H 41/02; F16H 47/02; F16H 47/06; F16H 61/48; F16H 7/08; F16H 9/12; Y02E 10/72; Y02E 60/16; Y02E 70/30
See application file for complete search history.

(56) References Cited

U.S. PATENT DOCUMENTS

| | | |
|---|---|---|
| 4,565,110 A | 1/1986 | Ito |
| 4,838,024 A | 6/1989 | Yamamoto et al. |
| 4,850,192 A | 7/1989 | Mitsumasa et al. |

(Continued)

FOREIGN PATENT DOCUMENTS

| | | |
|---|---|---|
| CN | 1229891 | 9/1999 |
| CN | 101016882 | 8/2007 |

(Continued)

*Primary Examiner* — Jesse S Bogue
(74) *Attorney, Agent, or Firm* — Bauer & Joseph

(57) ABSTRACT

A hydraulic continuous variable transmission is provided to connect a wind turbine and a generator. The hydraulic continuous variable transmission has a primary paddle wheel and a number of secondary paddle wheels for macro speed control. Also provided are pneumatic paddle wheels for micro speed control. A controller is included that measures AC electrical characterized output to load or line for speed control.

8 Claims, 3 Drawing Sheets

(56) References Cited

U.S. PATENT DOCUMENTS

| | | |
|---|---|---|
| 4,914,914 A | 4/1990 | Inoue |
| 4,916,900 A | 4/1990 | Iino et al. |
| 4,922,717 A | 5/1990 | Furumoto et al. |
| 4,945,482 A | 7/1990 | Nishikawa et al. |
| 4,970,862 A | 11/1990 | Maki et al. |
| 5,072,587 A | 12/1991 | Ikejiri et al. |
| 7,679,207 B2 | 3/2010 | Cory |
| 8,358,024 B2 | 1/2013 | Tsutsumi |
| 8,522,538 B2 | 9/2013 | Ingersoll |
| 9,109,512 B2 | 8/2015 | Ingersoll |
| 9,217,412 B2 | 12/2015 | Blake |
| 2007/0191180 A1* | 8/2007 | Yang .................. B60W 10/26 477/5 |
| 2008/0284170 A1 | 11/2008 | Cory |
| 2009/0319135 A1 | 12/2009 | Petzold et al. |
| 2010/0244447 A1* | 9/2010 | Gopalswamy .......... F03D 9/11 290/55 |
| 2011/0142596 A1 | 6/2011 | Nies |
| 2012/0161442 A1 | 6/2012 | Chapple |
| 2013/0009612 A1 | 1/2013 | Caldwell |
| 2014/0373521 A1 | 12/2014 | DeVita |
| 2022/0117120 A1* | 4/2022 | Koerner ............... H05K 7/1492 |
| 2023/0163622 A1* | 5/2023 | Kim .......................... H02J 3/30 60/659 |

FOREIGN PATENT DOCUMENTS

| | | |
|---|---|---|
| CN | 102162431 | 8/2011 |
| CN | 202326016 | 7/2012 |
| CN | 104066977 | 9/2014 |
| CN | 104214333 | 12/2014 |
| CN | 204733052 | 10/2015 |
| CN | 107762733 | 3/2018 |
| DE | 195 30 253 | 11/1996 |
| DE | 102011084573 | 4/2013 |
| EP | 2 851 562 | 3/2015 |
| GB | 1514995 | 6/1978 |
| KR | 2014-0140460 | 12/2014 |
| WO | 2013/114437 | 8/2013 |

\* cited by examiner

HYDRAULIC CONTINUOUS VARIABLE SPEED SYSTEM HAVING HYDRAULIC AND PNEUMATIC SPEED CONTROLS AND A METHOD OF USE

FIELD OF THE INVENTION

This invention relates to a system using a continuous variable transmission with pneumatic assist for micro level speed control and optimizing power generation from a turbine (wind or water) by evaluating AC electrical characteristics at the load/line after accomplishing energy generation of an entire power arrangement.

BACKGROUND OF THE INVENTION

Continuous variable transmissions (CVT) are known and have been used in bicycles, motor vehicles, winches, hoists, for power transfer, and the like. There are many variations of design that have been developed for these devices, and types include variable diameter pulleys with belts, toroidal or roller based, friction based, hydrostatic based, ratcheting based, magnetics, etc.

Examples of United States Patents that relates to CVT include U.S. Pat. Nos. 4,565,110, 4,970,862, 4,945,482, 4,922,717, 5,072,587, 4,916,900, 4,914,914, 4,850,192, and 4,838,024, all of which are hereby incorporated in their entirety be reference. This prior art describes CVT speed through pumps, pistons, gears, belts, pulleys, clutches, or valves to regulate the macro speed of the secondary shaft for vehicles.

Another example of a CVT is found in U.S. Pat. No. 7,679,207, also incorporated by reference. This patent generically describes a system that includes a wind power apparatus, CVT, generator, and CVT control. Great detail is provided for the wind turbine description, while the CVT and the tachometer are generically defined. CVT control techniques of the shaft speed are designated by pitch and blade deflection of the turbines and through deployment of a controller. In other words, the controller is compensating the speed output of the CVT by adjusting the drive speed of the turbine by physical characteristics of the turbine itself. A wind turbine of any configuration has a drive shaft and this arrangement can be considered an "engine. The continuous variable transmission (CVT) in general terms provide a variable speed mechanical method between the engine and a generator, the generator generating electricity as a result of the wind turbine or engine operation.

However, a need exists for improvements in CVT given their mechanically complex and expensive designs and limited modes of control. The present invention responds to this need with an improved CVT.

SUMMARY OF INVENTION

The present invention provides a pneumatically-assisted, hydraulic CVT that does not require pumps, pistons, gears, belts, pulleys, clutches, or valves to vary the hydraulic fluid pressure for operation. One part of the control of operation is with a programmable logic controller, or similar device or means that monitors the output of the inverter output to electrical load/line and then controls the system, including both hydraulic and pneumatic aspects, for variable speed control of the CVT to produce a reactive balance electrical source and minimize load erraticism.

The invention also provides for pneumatic energy storage to drive the generator, when disengaged from wind turbine, to produce electricity during very low or very high wind conditions.

Features of the invention include:
- a hydraulic continuous variable speed (CVT) device for macro level speed adjustments;
- a pneumatic system for micro level speed adjustments of CVT;
- a pneumatic energy storage method for direct drive of turbine generator;
- a pneumatic control method for braking generator, and
- a control system that measures the AC electrical characteristic of the output from the energy system to the load/line, wherein the control system can activate a series of control valves to adjust CVT speed at the micro level.

More specifically, the invention includes both a hydraulic continuous variable speed system and a method of use. The system has a turbine output shaft and electrical generator input shaft. The system includes a hydraulic system having first hydraulic chamber linked to the turbine output shaft and a second hydraulic chamber linked to the electrical generator input shaft. The first and second hydraulic chambers are in hydraulic communication with each other, the first and second hydraulic chambers being for macro level speed adjustment of the electrical generator input shaft.

The system also has a pneumatic system having a first and second pneumatic chambers. The first pneumatic chamber is linked to the turbine output shaft for producing compressed air and storing it in at least one storage tank. The second pneumatic chamber is linked to the electrical generator input shaft and the at least one storage tank for one or more of micro speed adjustment of the electrical generator input shaft, braking of the electrical generator input shaft, and direct drive of the electrical generator input shaft.

The system also includes a controller, the controller monitoring the output of an electrical generator connected to the electrical generator input shaft, comparing the output to a load/line of an electrical distribution grid, and adjusting the speed of the electrical generator shaft based on measurements of the load/line of the electrical distribution grid using one or more of the hydraulic system and pneumatic system to manage power supplied to the electrical distribution grid.

The hydraulic system can include a series of hydraulically powered paddle wheels, at least one paddle wheel associated with the first hydraulic chamber and a plurality of paddle wheels associated with the second hydraulic chamber. Each paddle wheel has an input and output valve, operation of the input and output valves controlled by the controller.

The paddle wheels in the second hydraulic chamber are differently-sized, and preferably range in size from smallest to largest in a direction toward the electrical generator so as to increase or decrease the speed of the electrical generator input shaft. The hydraulic system also includes a reservoir in communication with the first and second hydraulic chambers.

The pneumatic system includes at least one paddle wheel associated with the first pneumatic chamber and at least one paddle wheel associated with the second pneumatic chamber.

The invention also includes a method of controlling the output of a turbine comprising providing the hydraulic continuous variable speed system described above between the turbine and an electrical generator and controlling the speed of the electrical generator input shaft using the controller, the hydraulic system, and pneumatic system.

DETAILED DESCRIPTION OF THE INVENTION

Figure 1:
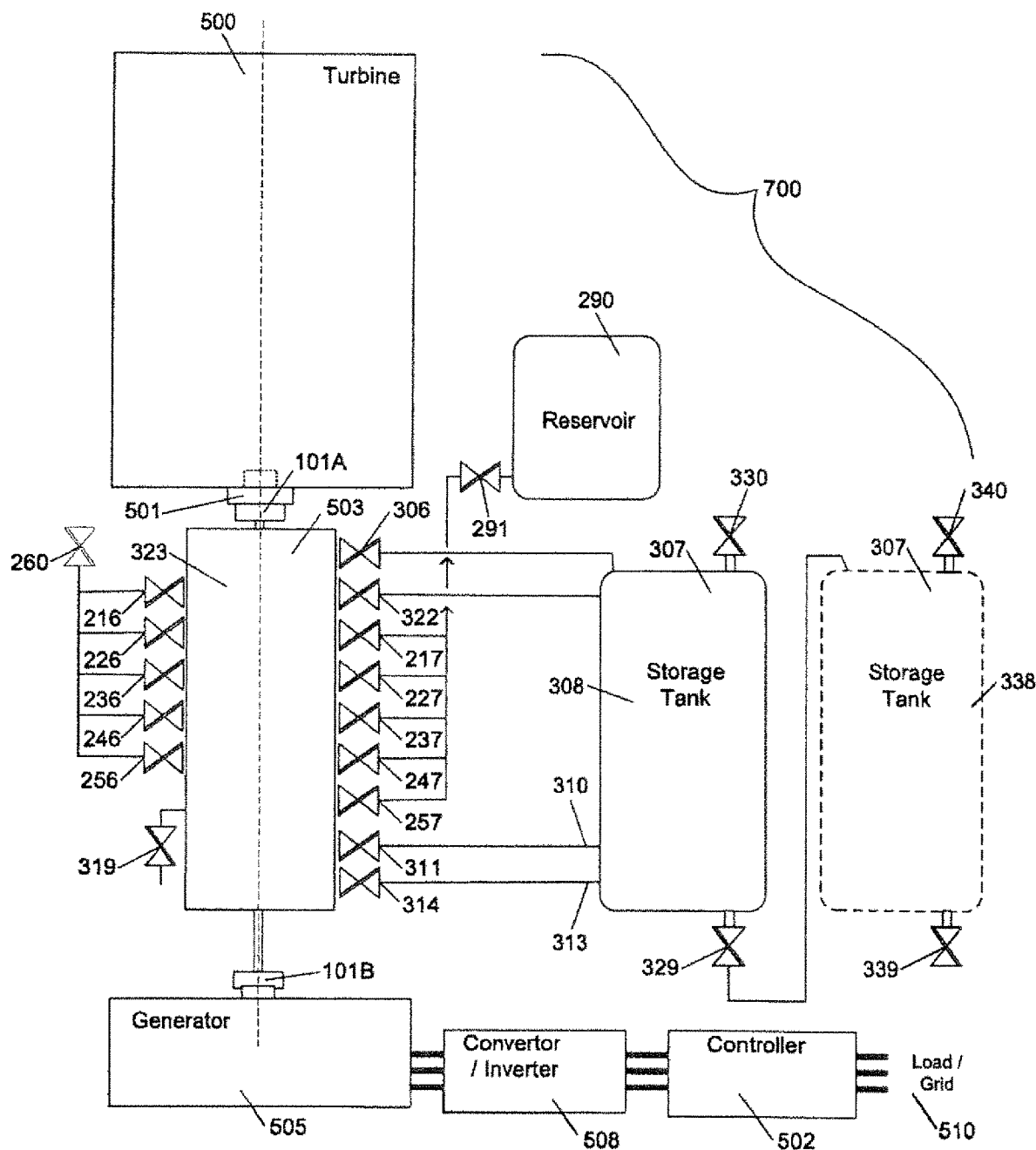
FIG. 1 depicts one embodiment of a turbine system for generating electrical power through an energy management arrangement and one that includes a CVT.

FIG. 1 illustrates an embodiment of system 700 that includes a turbine or wind engine 500, an integrated pneumatically-assisted hydraulic CVT 503, and a generator 505. The CVT 503 is positioned between the engine 500 and generator 505. The CVT has shaft adapters 101A and 101E for connection to the engine 500 and generator 505, respectively. A tachometer 501 may be added for pneumatic safety brake operation is so desired.

The CVT has a series of hydraulic valves 216, 217, 226, 227, 236, 237, 246, 247, 256, and 257. These valves provide selection of primary hydraulic chambers for speed control. Pneumatic control valves 306, 311, 314, and 319 are also provided and these valves provide secondary assistance to speed control of the CVT 503.

Hydraulic reservoir 290 is provided with valve 291. The hydraulic reservoir 290 supplies hydraulic fluid for operation. Also included as part of the system are a plurality of pneumatic storage tanks, two provided as 308 and 338, but additional storage tanks could be provided if a need exists for more storage. The pneumatic storage tanks 308 and 338 are provided for air operations using a multitude of separate control valves, two shown as 329, 339, for secondary assistance of the CVT 503 and pneumatic energy storage for continuous power generation.

Safety relief valves 330 and 340 are provided on each pneumatic storage tank 308 and 338, respectively, for safety purposes.

A system controller 502 is provided and positioned after the converter/inverter 508. The controller 502 monitors the output electrical characteristics of the power generation system 700 as compared to the load or electrical distribution grid 510 to constantly regulate the operations of the power generation system 700.

Figure 2:
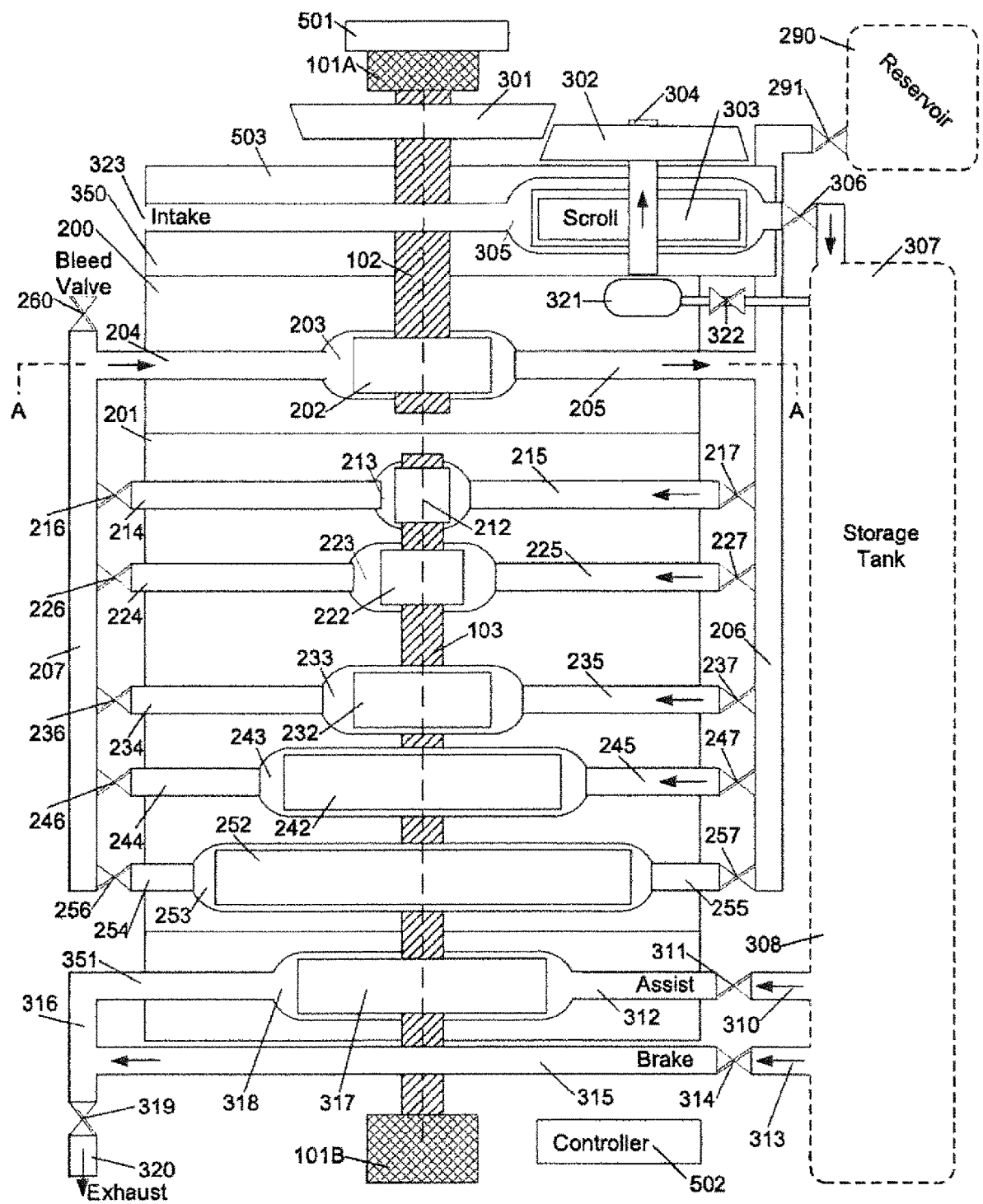
FIG. 2 provides more details of the CVT of FIG. 1, including features related to hydraulic macro speed control, pneumatic micro speed regulation, pneumatic braking, and backup operations of the CVT.

FIG. 2 provides further details the integrated pneumatic-assisted hydraulic CVT 503. The shaft adapter 101A is attached to engine 500 and provides a drive shaft 102 through an upper pneumatic chamber 350 and an upper hydraulic chamber 200.

A tapered gear 301 is provided above the pneumatic chamber 350 and is attached to the drive shaft 102 for selective operation of an integrated air compressor 303 provided in the pneumatic chamber 350. The compressor 303 is operational when a mating tapered gear 302 that is connected to a shaft 304 and the tapered gear 301 are engaged by an air actuator 321 that is controlled by valve 322. Pneumatic energy is delivered to storage tank 308 through control valve 306 and port 307. This pneumatic energy can also be used to deactivate actuator 321 and disengage gears 301 and 302. Intake and exhaust of air supply goes through port 323 in the pneumatic chamber.

The CVT 503 also includes hydraulic chambers 200 and 201, with chamber 200 being a primary source for fluid delivery. A system of hydraulic lines 204, 205, 214, 215, 224, 225, 234, 235, 244, 245, 254, and 255 run through the hydraulic chambers 200 and 201, while external hydraulic lines 206, 207 interconnect each of the lines through a series of control valves 216, 217, 226, 227, 236, 237, 246, 247, 256, and 257. A bleed valve 260 is provided on line 207 for bleeding purposes. A reservoir valve 291 is provided for line 206 and this valve offers the ability for hydraulic fluid bypass to disengage the engine 500 from the generator 505 hydraulically.

The hydraulic chamber 200 has a primary hydraulic paddle wheel 202, which is located within an inner chamber 203. The paddle wheel 202 propels hydraulic fluid at a rate based upon the rotational speed of the turbine to the selected secondary hydraulic drives 212, 222, 232, 242, or 252, which are located in the secondary hydraulic chamber 201. Hydraulic fluid is directed to one of more the secondary hydraulic drives based upon which pair of control valves 216/217, 226/227, 236/237, 246/247, or 256/257 are selected. The secondary hydraulic drives are also paddle wheels 212, 222, 232, 242, and 252, the paddle wheels located within inner chambers 213, 223, 233, 243, and 253, respectively. The paddle wheels 212, 22, 232, 242, and 252 are sized in proportion to the increase or decrease in turbine speed required for wide-ranging macro operations of the generator 505.

A secondary pneumatic chamber 351 is provided and positioned between the generator and the secondary hydraulic chamber 201. The secondary pneumatic chamber 351 provides the ability to optimize the generator 505 speed to minimize load or line 510 imbalances. Compressed air from storage tank 308 is supplied through port 310 for increasing generator 505 speeds, while port 314 is utilized to decrease generator 505 speeds. Control valves 311, 314, and 319 are provided and used to manage these micro operations of speed control. The secondary pneumatic chamber 351 includes paddle wheel 317, which is located in a secondary chamber 318 of the secondary pneumatic chamber 351. The paddle wheel 317 provide a means to adjust the generator 505 speed by small increments so that the regulation of the power provided to load/line 510 is nearly instantaneous. This allows for managing the consistency and quality of the power provided to the load/line 510.

The integrated pneumatic overdrive hydraulic CVT 503 can also be used for operation of the generator 505 operation when no or minimal engine/turbine 500 rotation occurs. With the series of storage tanks 338, etc. interfaced with the primary storage tank 308, the control valves 311, 314, 319, 320, and 329, which provide compressed air to the paddle wheel 317, and control valves 260 and 291, which can cutoff the hydraulic supply to the hydraulic chambers 200 and 201, are controlled to rotate internal shaft 103, which in-turn rotates a shaft of the generator 505 through the interface coupling 1018 to produce electricity at the managed power matching the load/line 510.

Figure 3:
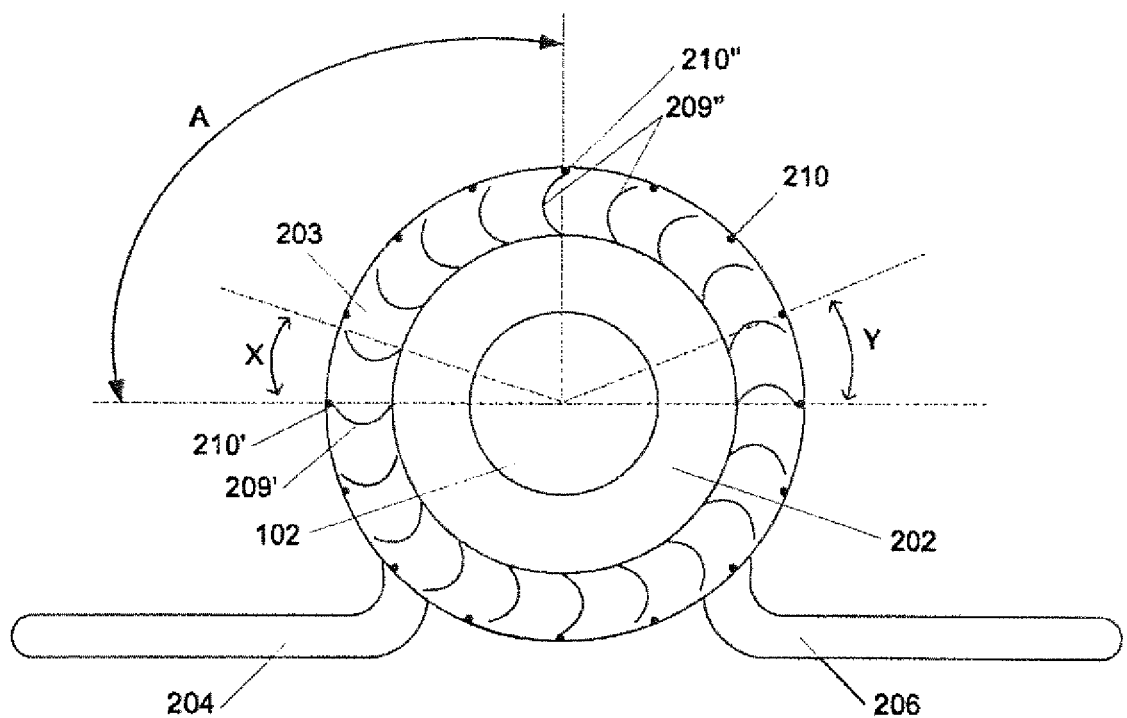
FIG. 3 illustrates an exemplary paddle wheel configuration of the pneumatic and hydraulic modules for the CVT of FIGS. 1 and 2.

FIG. 3 provides more detail about a paddle wheel for use in the CVT 503. As described above, chamber 200 has paddle wheel 202 and chamber 201 has paddle wheels 212, 222, 232, 242, and 252, with each paddle wheel positioned in its respective inner chambers 203, 213, 223, 233, 243, and 253. For example, paddle wheel 202 includes a series of paddles 209, which are located at X degrees in the axial rotation around the wheel 203. Seals 210 are located around the inner chamber 203 at Y degrees in axial rotation creating four sealed areas during the rotation of the paddle wheel 202. One sealed area is shown as "A", where the two paddles 209' and 209"meet with seals 210' and 210." Periods between wipes allows for self-lubrication of paddle wheel 202.

Intake tube 204 allows hydraulic fluid to enter the chamber as necessary, based upon the discharge of fluid from the paddle wheel 202 through tube 205 as shaft 102 rotates. The fluid from tube 205 enters tube 206 and flows through the selected control valve 217, 227, 237, 247, or 257 to the appropriate paddle wheel 212, 222, 232, 242, and 252 with the discharge of the fluid from the inner chamber 213, 223, 233, 243, and 253 being released through discharges ports 214, 224, 234, 244, and 254 to tube 207 via selected partner control valve 216, 226, 236, 246, and 256. Tube 207 returns fluid to the primary feed 204 of the paddle wheel chamber 203 and paddle wheel 202 to complete the hydraulic cycle for macro speed control within the CVT 503. Typically, ratios of 2 and 3 times for increase and decrease of speeds compared to the turbine speeds are designed for this macro level.

The pneumatic aspect of the CVT 503 allows for micro level speeds between the macro speeds ratio. More particularly, when the taper gear 301, attached to drive shaft 102 is engaged to tapered gear 302 by means of plunger 304, a scroll or screw type air compressor 303 is activated when wind speeds are available. This allows atmospheric air to enter the intake tube 323, be compressed, and exit through control valve 306 to the storage tank 308 via port 307. Compressed air can then be supplied from storage tank 308 through ports 310 and 311. Control valves 311 and 314 are rapidly activated to either reduce or surge the speed of the shaft 103 by means of the paddle wheel 317. In order for the hydraulic system to allow for these micro adjustments, bleed valve 260 and reservoir valve 291 are momentarily opened to permit pressure compensations. Air pressure is relieved through exhaust valve 319 when increasing generator 505 shaft speed. Decreasing speed of shaft 103 is generated when control valve 314 is activated and exhaust valve 319 is closed with pulse cycles so that compressed air in line 315 is directed back to the paddle wheel 317. The timing of these pulse cycles for micro speed control is generated by controller 502 to match the AC electrical waveform of the load/grid 510 to ensure power factors are maximized.

The two pneumatic chambers 350 and 351 allow for braking generator to full stop by fully opening control valve/bleed valve 260 and reservoir valve 291, while closing all of the hydraulic control valves 216, 217, 226, 227, 236, 237, 246, 247, 256, and 257. The fluid then simple cycles from paddle wheel 202 through reservoir 290, while the pneumatic control valve 314 is opened and 319 is closed creating a back pressure to stop shaft 103 from rotating.

The plurality of pneumatic storage tanks 308, 338, . . . can also provide the stored pneumatic energy to rotate shaft 103 and drive the generator 505 when there is no wind to drive turbine 500. In this mode, control valve/bleed valve 260 and reservoir valve 291 are fully opened and all of the hydraulic control valves 216, 217, 226, 227, 236, 237, 246, 247, 256, and 257 are closed. With this state of operation, the hydraulic system is in neutral. Then the control valve 311 and 319 can be opened and this allows the pneumatic energy to operate paddle wheel 317, which results in turning the shaft 103 at appropriate speed to operator generator 505 to match the AC electrical waveform of the load/grid 510.

The system and method of the invention provides a much improved way to take the rotation of the shaft of the engine, e.g., a wind turbine, and transmit that rotation to a generator in both a macro speed and micro speed controlled manner.

The invention also provides the ability to either disconnect the engine from the generator or run the generator when the engine is not rotating or rotating at an insignificant level.

As such, an invention has been disclosed in terms of preferred embodiments thereof which fulfills each and every one of the objects of the present invention as set forth above and provides a new and improved system to generate power using an engine, CVT, and generator and a method of use.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A hydraulic continuous variable speed system has a turbine output shaft and electrical generator input shaft and comprises:
    a hydraulic system having first hydraulic chamber linked to the turbine output shaft and a second hydraulic chamber linked to the electrical generator input shaft, the first and second hydraulic chambers in hydraulic communication with each other, the first and second hydraulic chambers for macro level speed adjustment of the electrical generator input shaft;
    a pneumatic system having a first pneumatic chamber linked to the turbine output shaft for producing compressed air and storing it in at least one storage tank, a second pneumatic chamber linked to the electrical generator input shaft and the at least one storage tank for one or more of micro speed adjustment of the electrical generator input shaft, braking of the electrical generator input shaft, and direct drive of the electrical generator input shaft, and
    a controller for monitoring the output of an electrical generator connected to the electrical generator input shaft, comparing the output to a load/line of an electrical distribution grid, and adjusting the speed, including braking to a full stop, of the electrical generator shaft based on measurements of the load/line of the electrical distribution grid using one or more of the hydraulic system and pneumatic system to manage power supplied to the electrical distribution grid.

2. The system of claim 1, further comprising a series of hydraulically powered paddle wheels, at least one paddle wheel associated with the first hydraulic chamber and a plurality of paddle wheels associated with the second hydraulic chamber, each paddle wheel having an input and output valve, operation of the input and output valves controlled by the controller.

3. The system of claim 2, wherein the paddle wheels in the second hydraulic chamber are differently sized.

4. The system of claim 3, wherein the paddle wheels in the second hydraulic chamber range in size from smallest to largest in a direction toward the electrical generator so as to increase or decrease the speed of the electrical generator input shaft.

5. The system of claim 1, further comprising a reservoir in communication with the first and second hydraulic chambers.

6. The system of claim 1, wherein the pneumatic system includes at least one paddle wheel associated with the first pneumatic chamber and at least one paddle wheel associated with the second pneumatic chamber.

7. A method of controlling the output of an engine comprising providing the hydraulic continuous variable speed system of claim 1 between the engine and an electrical generator and controlling the speed of an electrical generator input shaft using the controller, the hydraulic system, and the pneumatic system.

8. The method of claim 1, wherein the engine is a wind turbine.

\* \* \* \* \*